United States Patent [19]

Dunbar et al.

[11] Patent Number: 5,315,821
[45] Date of Patent: May 31, 1994

[54] AIRCRAFT BYPASS TURBOFAN ENGINE THRUST REVERSER

[75] Inventors: Donald K. Dunbar, Sharonville; Bobby R. Delaney, Loveland, both of Ohio

[73] Assignee: General Electric Company, Cincinnati, Ohio

[21] Appl. No.: 14,017

[22] Filed: Feb. 5, 1993

[51] Int. Cl.$^5$ ............................................. F02K 3/02
[52] U.S. Cl. .................................. 60/226.1; 60/226.2; 60/226.3; 244/110 B
[58] Field of Search ................. 60/226.1, 226.2, 226.3, 60/230; 244/110 B

[56] References Cited

U.S. PATENT DOCUMENTS

| | | | |
|---|---|---|---|
| 3,347,467 | 10/1967 | Carl et al. | 239/265.31 |
| 3,875,742 | 4/1975 | McMurtry et al. | 60/226.2 |
| 3,897,001 | 7/1975 | Helmintoller, Jr. et al. | 60/226.2 |
| 3,931,708 | 1/1976 | Motycka | 60/226.2 |
| 4,030,291 | 6/1977 | Sargisson | 60/226.1 |
| 4,064,692 | 12/1977 | Johnson et al. | 60/261 |
| 4,175,384 | 11/1979 | Wagenknecht et al. | 60/226.3 |
| 4,185,457 | 1/1980 | Parker et al. | 60/204 |
| 4,275,560 | 6/1981 | Wright et al. | 60/226.3 |
| 4,278,220 | 7/1981 | Johnston et al. | 244/110 B |
| 4,371,132 | 2/1983 | Woodward | 244/110 B |
| 5,046,307 | 9/1991 | Matta et al. | 60/226.2 |
| 5,090,196 | 2/1992 | Balzer | 60/226.2 |
| 5,090,197 | 2/1992 | Dubois | 60/226.2 |
| 5,228,641 | 7/1993 | Remlaoui | 60/226.2 |

FOREIGN PATENT DOCUMENTS

| | | | |
|---|---|---|---|
| 1187491 | 2/1965 | Fed. Rep. of Germany | 60/226.2 |
| 2842915 | 4/1979 | Fed. Rep. of Germany | 244/110 B |
| 2182724 | 5/1987 | United Kingdom | 60/226.2 |
| 2243876 | 11/1991 | United Kingdom | 60/226.2 |

OTHER PUBLICATIONS

"TF34 Convertible Engine System Technology Program Engine Design and Test Report", May 1983, by GE for NASA Contract NAS'3-22752 vol. I-cover page; pp. 2, 15, 20-22 and 83-86, vol. II-cover page; pp. 20-21.

Primary Examiner—Richard A. Bertsch
Assistant Examiner—Howard R. Richman
Attorney, Agent, or Firm—Jerome C. Squillaro; Nathan D. Herkamp

[57] ABSTRACT

An aircraft bypass turbofan engine subassembly for ground deceleration (e.g., thrust reversal). A fan nacelle has a through passageway connecting its inner exterior surface and outer exterior surface. A passageway end is located on the inner exterior surface aft of the aft-most row of fan rotor blades. A row of pivotable fan outlet guide vanes is located radially between the fan and core nacelles and longitudinally aft of the flow splitter and the passageway end. Apparatus is provided to pivot the vanes to block passage of bypass air and to open the passageway for ground deceleration.

9 Claims, 3 Drawing Sheets

AIRCRAFT BYPASS TURBOFAN ENGINE THRUST REVERSER

BACKGROUND OF THE INVENTION

The present invention relates generally to a type of gas turbine engine known as an aircraft bypass turbofan engine, and more particularly to an engine subassembly which provides ground deceleration (such as thrust reversing) for the aircraft.

A gas turbine engine includes a core engine having a high pressure compressor to compress the air flow entering the core engine, a combustor in which a mixture of fuel and the compressed air is burned to generate a propulsive gas flow, and a high pressure turbine which is rotated by the propulsive gas flow and which is connected by a larger diameter shaft to drive the high pressure compressor. A typical aircraft bypass turbofan engine adds a low pressure turbine (located aft of the high pressure turbine) which is connected by a smaller diameter coaxial shaft to drive a front fan (located forward of the high pressure compressor) which is surrounded by a fan nacelle and which may also drive a low pressure compressor (located between the front fan and the high pressure compressor). The low pressure compressor sometimes is called a booster compressor or simply a booster. A flow splitter, located between the fan and the first (usually the low pressure) compressor, separates the air which exits the fan into a core engine airflow and a surrounding bypass airflow. The bypass airflow from the fan exits the fan nozzle (also called the fan bypass nozzle or the fan exhaust nozzle) to provide most of the engine thrust (in the case of a high bypass engine) for the aircraft. Some of the engine thrust comes from the core engine airflow after it flows through the low and high pressure compressors to the combustor and is expanded through the high and low pressure turbines and accelerated out of the core nozzle (also called the core exhaust nozzle). A core nacelle surrounds the low and high pressure compressors and turbines and the intervening combustor.

Aircraft bypass turbofan engines typically employ thrust reversers for ground deceleration. The term "deceleration" means a negative acceleration such as, but not limited to, slowing down a forward-moving aircraft on the runway or backing an aircraft away from the airport departure gate. Prior art thrust reversers are located in the fan bypass duct (the area radially between the fan and core nacelles and longitudinally between the flow splitter and the fan nozzle). Known designs include cascade and door type thrust reversers. Both designs employ relatively heavy blocker doors with robust actuation systems to block the flow of bypass air from exiting the fan nozzle. A heavy engine is not an efficient engine. What is needed is a lighter turbofan engine subassembly to provide ground deceleration during aircraft landings and to back the aircraft away from the airport departure gate.

SUMMARY OF THE INVENTION

It is an object of the invention to provide an aircraft bypass turbofan engine subassembly for ground deceleration, such as during aircraft landings, without the use of blocker doors to block the flow of bypass air from exiting the fan nozzle.

The invention provides an aircraft bypass turbofan engine subassembly which includes a longitudinally aftmost row of generally radially outwardly extending fan rotor blades and a core nacelle located longitudinally aft of the blades and having a longitudinally forward end defining a flow splitter. The subassembly also includes a fan nacelle circumferentially surrounding the blades and at least a portion of the core nacelle. The fan nacelle has a longitudinally aft end defining a fan nozzle, an inner exterior surface facing generally radially inward, an outer exterior surface facing generally radially outward, and a through passageway connecting the surfaces and having an end disposed on the inner exterior surface longitudinally aft of the blades. The subassembly further includes a row of pivotable fan outlet guide vanes radially located between the fan and core nacelles and longitudinally located aft of the flow splitter and passageway end. Apparatus is provided for pivoting the vanes such that for ground deceleration (such as for thrust reversal) the vanes generally block airflow therethrough. Apparatus is also provided for opening the passageway for ground deceleration and for closing the passageway.

Several benefits and advantages are derived from the aircraft bypass turbofan engine subassembly of the invention. The blocker doors of conventional thrust reversers are eliminated reducing engine weight which increases engine efficiency. The subassembly's pivotable fan outlet guide vanes may also be varied during flight (including engine windmilling when the engine is not operating) to adjust for varying fan blade rotational speeds to either increase engine performance or to reduce engine noise, as can be appreciated by those skilled in the art.

BRIEF DESCRIPTION OF THE DRAWINGS

The accompanying drawings illustrate a preferred embodiment of the present invention wherein.

DETAILED DESCRIPTION OF THE INVENTION

Figure 1:
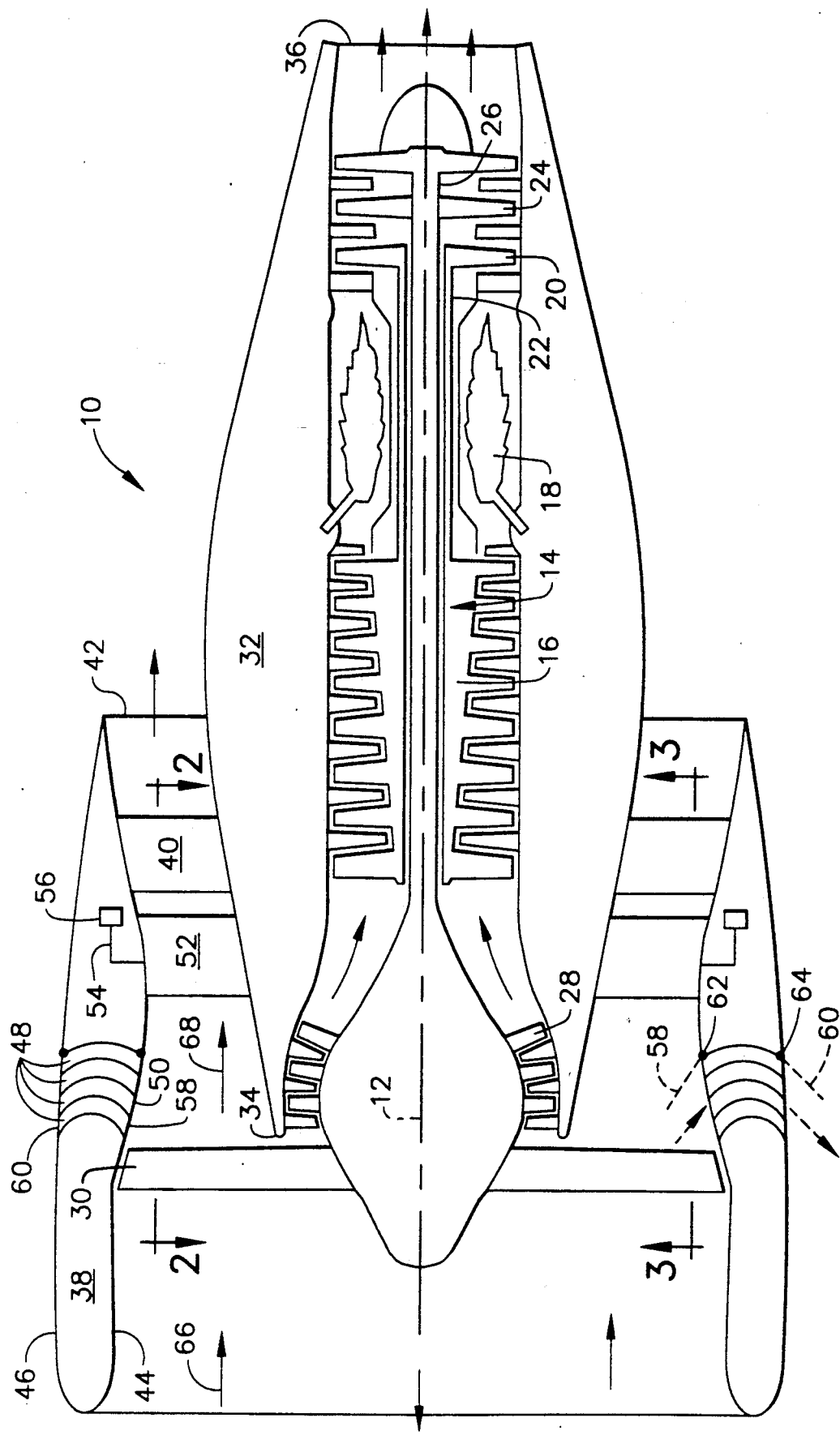
FIG. 1 is a schematic cross-sectional side view of an aircraft bypass turbofan engine.

Referring now to the drawings, and particularly to FIG. 1, there is illustrated generally an aircraft bypass turbofan engine 10 having a generally longitudinally extending axis or centerline 12 extending forward and aft. It is noted that unnumbered arrows (and numbered arrows if so described) indicate the direction of airflow (or gas flow) through the engine 10. The bypass turbofan engine 10 includes a core engine (also called a gas generator) 14 which comprises a high pressure compressor 16, a combustor 18, and a high pressure turbine 20, all arranged in a serial, axial flow relationship. A larger diameter annular drive shaft 22, disposed coaxially about the centerline 12 of the engine 10, fixedly interconnects the high pressure compressor 16 and the high pressure turbine 20.

The core engine 14 is effective for generating combustion gases. Pressurized air from the high pressure compressor 16 is mixed with fuel in the combustor 18 and ignited, thereby generating combustion gases. Some work is extracted from these gases by the high pressure turbine 20 which drives the high pressure compressor 16. The remainder of the combustion gases are discharged from the core engine 14 into a low pressure or power turbine 24. The low pressure turbine 24 is fixedly attached to a smaller diameter annular drive shaft 26 which is disposed coaxially about the centerline 12 of the engine 10 within the larger diameter annular drive shaft 22. The smaller diameter annular drive shaft 26 rotates an interconnected low pressure compressor (also called a booster or booster compressor) 28 and a fan including a longitudinally aft-most row of generally radially outwardly extending fan rotor blades 30. Preferably, the blades 30 are fixed-pitch blades 30. Although only one row of fan rotor blades 30 is shown in FIG. 1, a particular engine design may have additional rows of fan rotor blades with associated intervening rows of fan stator vanes (also called fan guide vanes).

The core engine 14, low pressure turbine 24, and low pressure compressor 28 are surrounded by a casing or core nacelle 32 which supports the drive shafts 22 and 26 by bearings (not shown). The core nacelle 32 is disposed longitudinally aft of the blades 30 and has a longitudinally forward end defining a flow splitter 34 and a longitudinally aft end defining a core nozzle 36.

A fan nacelle 38 circumferentially surrounds the blades 30 and at least a portion of the core nacelle 32. The fan nacelle 38 is supported about the core nacelle 32 by a plurality of support members 40, such as fan frame struts 40 or stationary (i.e., non-rotating) structural fan outlet guide vanes, only two of which are shown in FIG. 1. It is noted that blades and vanes have cambered airfoil shapes while struts do not. The fan nacelle 38 has a longitudinally aft end defining a fan nozzle 42, an inner exterior surface 44 facing generally radially inward, an outer exterior surface 46 facing generally radially outward, and a through passageway 48 connecting the surfaces 44 and 46 and having a terminus 50 disposed on the inner exterior surface 44 longitudinally aft of the blades 30. Preferably, the passageway 48 is a thrust reverser passageway 48, and, in an exemplary embodiment, the thrust reverser passageway 48 is a cascade-type thrust reverser passageway 48.

A row of pivotable fan outlet guide vanes 52 is radially disposed between the fan and core nacelles 38 and 32 and longitudinally disposed aft of the flow splitter 34 and the passageway terminus 50. Preferably, the row of vanes 52 is the nearest row of airfoils to the blades 30 longitudinally aft and radially outward of the flow splitter 34.

Means are provided for pivoting the vanes 52 such that for ground deceleration the vanes 52 generally block airflow therethrough. Preferably such vane-pivoting or vane-turning means include a lever arm 54 connected to the pivotable vanes 52. In an exemplary embodiment, the lever arm 54 is actuated by a unison ring 56. Other such vane-pivoting means include various mechanical and electro-mechanical devices, as is known to those skilled in the art.

Means also are provided for opening the passageway 48 for ground deceleration and for closing the passageway 48. Preferably such means includes passageway entrance doors 58 located on the inner exterior surface 44 of the fan nacelle 38 and passageway exit doors 60 located on the outer exterior surface 46 of the fan nacelle 38. Such passageway doors 58 and 60 may be pivoting (such as about pivot points 62 and 64 as shown in FIG. 1) or sliding doors actuated by various mechanical and electro-mechanical devices, as is known to the artisan. Other such air valve arrangements, as is known to those skilled in the art.

Figure 2:
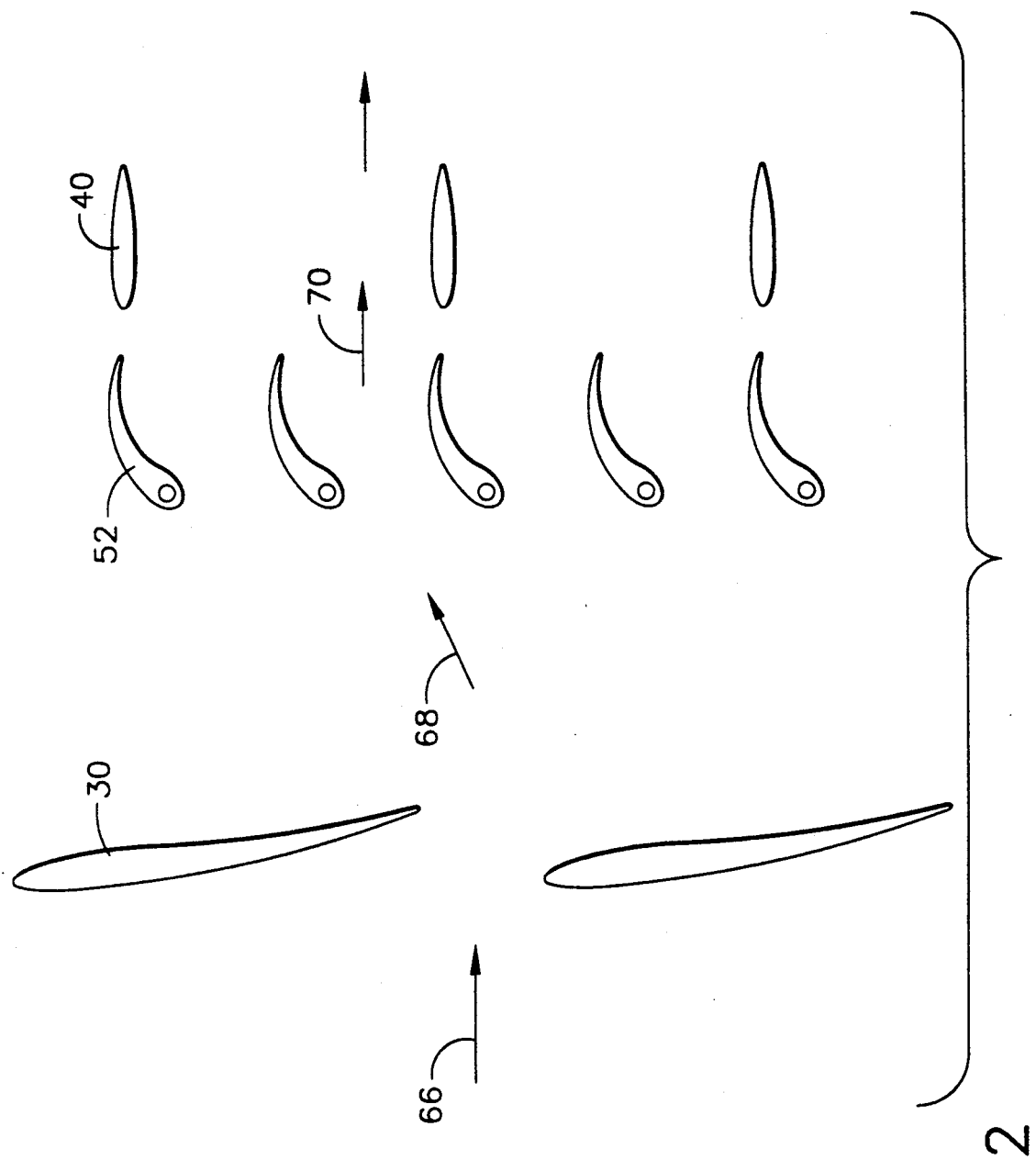
FIG. 2 is a schematic top view taken along lines 2—2 of FIG. 1 showing the pivotable fan outlet guide vanes open to flow.
Figure 3:
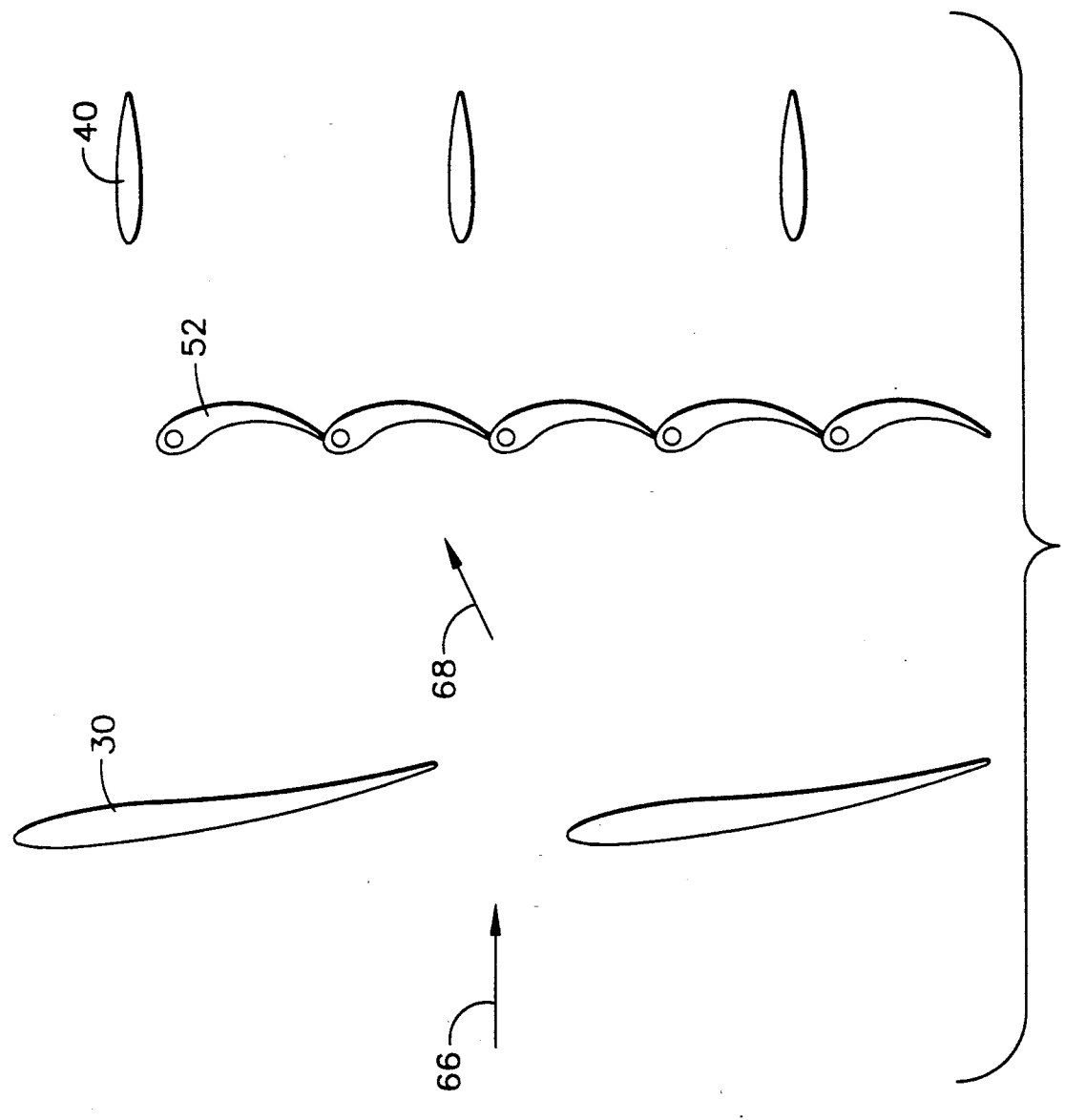
FIG. 3 is a schematic bottom view taken along lines 3—3 of FIG. 1 showing the pivotable fan outlet guide vanes closed (blocked) to flow.

In operation, for takeoff and flight conditions, the passageway doors 58 and 60 would be closed as shown by the solid lines in the upper portion of FIG. 1, and the vanes 52 would be open to flow as shown in FIG. 2. For ground deceleration, such as during aircraft landings and for backing the aircraft away from the airport departure gate, the passageway doors 58 and 60 would be opened as shown by the dashed lines in the lower portion of FIG. 1, and the vanes 52 would be closed (blocked) to flow as shown in FIG. 3.

A best mode of operating the invention includes keeping the passageway doors 58 and 60 closed during flight while pivoting the vanes 52 to reduce the swirl angle of the bypass air discharged from the blades 30 (i.e., the blade swirl angle). The blade swirl angle depends on the rotational speed of the blades 30 which varies during flight, such dependence being capable of analytical calculation or empirical measurement as can be accomplished by those skilled in the art. The swirl angle is the angle of the bypass air (i.e., the air flowing radially between the core and fan nacelles 32 and 38) relative to the engine's longitudinal axis 12. Engine drag is reduced and engine thrust is increased if the swirl angle is zero at the fan nozzle 42. FIG. 2 shows longitudinally directed ambient air 66 entering the area of the blades 30 and exiting therefrom with an airflow direction 68 corresponding to a large blade swirl angle, such air then entering the area of the vanes 52 which turn the airflow such that air exits the vanes 52 with an airflow direction 70 corresponding to a small (essentially zero) vane swirl angle. Such vanes 52 would be pivoted during, for example, a cruise mode of engine operation to adjust to a varying blade swirl angle to reduce the swirl angle of the bypass air at the fan nozzle 42 and thus decrease drag and increase thrust to improve engine efficiency. It is noted that such improved engine efficiency does not require the presence of a thrust reverser or other means for ground deceleration (i.e., the engine 10 need not have the passageway 48).

A first and a second exemplary method of operating the engine do not require the passageway 48 (whether for a thrust reverser or for another means of ground deceleration), do not require a fan nozzle 42 (e.g., the bypass air could be mixed with the core exhaust in a "mixed-flow" type of exhaust nozzle), and do not require the pivotable fan outlet guide vanes 52 to be turned to generally block airflow therethrough (i.e., such vanes would be variable-pitch vanes wherein either the entire vane, the leading edge, or the trailing edge would be pivotable (or otherwise designed) to change vane pitch but not necessarily pivotable (or otherwise designed) so as to generally block airflow therethrough). The first exemplary method includes the steps of sensing an engine out condition (whether the engine is out with the fan rotor windmilling or whether the engine is out with the fan rotor locked) for the engine, repeatedly measuring fan rotor speed during the engine out condition, and adjusting the pitch of the variable-pitch vanes to a predetermined value as a function of the current fan rotor speed measurement to generally maximize airflow through the vanes during the engine out condition. The second exemplary method includes the steps of repeatedly measuring fan rotor speed, adjusting the pitch of the variable-pitch vanes to a preselected value as a function of the current fan rotor speed measurement to generally minimize engine noise during a noise reduction mode of engine operation, and adjusting the pitch of the variable-pitch vanes to a preestablished value as a function of the current fan rotor speed measurement during a mode of engine operation (e.g., cruise) different from the noise reduction mode, wherein the preselected value is different from the preestablished value for an identical fan rotor speed measurement.

It is noted that an engine out condition can be sensed by a zero fuel flow to the combustor or by a low temperature at the combustor or high pressure turbine, such fuel flow and temperature being measured by conventionally means, as is known in the art. It is also noted that fan rotor speed is typically measured by an electromagnetic or optical sensor pick-up located near the fan shaft 26 or located proximate the blade tips of the fan blades 30 or booster 28. The relationships between the predetermined values, the preselected values, and the preestablished values of the vane pitch as a function of fan rotor speed can be calculated analytically or measured empirically for maximizing airflow through the vanes during an engine out condition, for minimizing engine noise, and (for example) for minimizing drag and maximizing thrust to improve engine efficiency during cruise. Analytical calculations could employ computers and empirical measurements could employ ground tests or flight tests. Such analytical calculations and empirical measurements are all within the purview of those skilled in the art.

The foregoing description of the invention has been presented for purposes of illustration. It is not intended to be exhaustive or to limit the invention to the precise form disclosed. For example, the passageway need not be a thrust reverser passageway but merely one which diverts the bypass air away from its generally longitudinal-flow direction. Obviously many modifications and variations are possible in light of the above teachings all of which are within the scope of the claims appended hereto in which the invention is set forth in terms of an aircraft bypass turbofan engine subassembly.

We claim:

1. An aircraft bypass turbofan engine subassembly comprising:
  (a) a generally longitudinally extending axis extending forward and aft;
  (b) a longitudinally aft-most row of generally radially outwardly extending fan rotor blades;
  (c) a core nacelle disposed longitudinally aft of said blades and having a longitudinally forward end defining a flow splitter;
  (d) a fan nacelle circumferentially surrounding said blades and at least a portion of said core nacelle and having:
    (1) a longitudinally aft end defining a fan nozzle,
    (2) an inner exterior surface facing generally radially inward,
    (3) an outer exterior surface facing generally radially outward, and
    (4) a through passageway connecting said surfaces and having a terminus disposed on said inner exterior surface longitudinally aft of said blades;
  (e) a row of pivotable fan outlet guide vanes radially disposed between said fan and core nacelles and longitudinally disposed aft of said flow splitter and said passageway terminus;
  (f) means for pivoting said vanes such that for ground deceleration said vanes generally block airflow therethrough; and
  (g) means for opening said passageway for ground deceleration and for closing said passageway.

2. The subassembly of claim 1, wherein said passageway is a thrust reverser passageway.

3. The subassembly of claim 2, wherein said thrust reverser passageway is a cascade-type thrust reverser passageway.

4. The subassembly of claim 1, wherein said blades are fixed-pitch blades.

5. The subassembly of claim 4, wherein said passageway is a thrust reverser passageway.

6. The subassembly of claim 1, wherein said row of vanes is the nearest row of airfoils to said blades longitudinally aft and radially outward of said flow splitter.

7. The subassembly of claim 6, wherein said passageway is a thrust reverser passageway.

8. The subassembly of claim 6, wherein said blades are fixed-pitch blades.

9. The subassembly of claim 8, wherein said passageway is a thrust reverser passageway.

* * * * *